United States Patent [19]
Wisecup

[11] Patent Number: 6,167,532
[45] Date of Patent: Dec. 26, 2000

[54] AUTOMATIC SYSTEM RECOVERY

[75] Inventor: George D. Wisecup, Houston, Tex.

[73] Assignee: Compaq Computer Corporation, Houston, Tex.

[21] Appl. No.: 09/019,178

[22] Filed: Feb. 5, 1998

[51] Int. Cl.[7] .................................................. G06F 11/08
[52] U.S. Cl. .................................................................. 714/23
[58] Field of Search ........................ 713/300, 2; 714/15, 714/23, 36, 55; 380/4; 707/203

[56] References Cited

U.S. PATENT DOCUMENTS

| | | | |
|---|---|---|---|
| 4,377,000 | 3/1983 | Staab | 714/55 |
| 5,390,324 | 2/1995 | Burckhartt et al. | 714/23 |
| 5,432,927 | 7/1995 | Grote et al. | 713/2 |
| 5,471,674 | 11/1995 | Stewart et al. | 713/2 |
| 5,574,915 | 11/1996 | Lemon et al. | 712/220 |
| 5,596,711 | 1/1997 | Burckhartt et al. | 714/23 |
| 5,600,785 | 2/1997 | Potter | 714/23 |
| 5,793,943 | 8/1998 | Noll | 714/6 |
| 5,826,075 | 10/1998 | Bealkowski et al. | 380/4 |
| 5,832,283 | 11/1998 | Chou et al. | 713/300 |
| 5,960,445 | 9/1999 | Tamoti et al. | 707/203 |

FOREIGN PATENT DOCUMENTS

| | | |
|---|---|---|
| 0803812-A1 | 4/1997 | European Pat. Off. . |
| 2295908 | 12/1994 | United Kingdom . |

*Primary Examiner*—Albert De Cady
*Assistant Examiner*—Nguyêñ Huân Nguyên
*Attorney, Agent, or Firm*—Sharp, Comfort & Merrett, P.C.

[57] ABSTRACT

A computer system includes system memory, containing BIOS instructions, having multiple bootable partitions and the ability to enable Automatic System Recovery (ASR) protection during an early phase of the boot process. Early ASR allows errors occurring during the boot process to be handled by established ASR techniques. Multiple BIOS partitions allows a user to upgrade and/or test new system routines without the potential of losing the functionality of their existing system.

48 Claims, 6 Drawing Sheets

AUTOMATIC SYSTEM RECOVERY

BACKGROUND OF THE INVENTION

The invention generally relates to failure recovery systems and, more particularly, to a system and method that can detect and respond to system failures during system start-up and which can also select between multiple system memories to use during start-up operations.

To guard against failures that occur during operation, a computer system may employ Automatic System Recovery (ASR) technology. ASR technology is designed to protect a computer system from critical errors, such as component or memory failures, during normal operations. A computer system employing ASR technology begins operation (on power-up or reboot) by initially executing trusted instructions from a first portion of the system's read-only memory (ROM). A second portion of ROM is then loaded into the system's random access memory (RAM) and executed to complete the initial start-up operation. On completion of the start-up process the computer system's operating system is loaded and ASR is enabled.

SUMMARY OF THE PRESENT INVENTION

Generally, the invention provides apparatus and methods to recover from a computer system error occurring during the start-up process. In one embodiment, a first programmable memory includes a plurality of bootable images, and a second programmable memory includes information indicating which one of the plurality of bootable images is selected for use during start-up. If an error in the first selected bootable image is detected another of the plurality of bootable images is selected and computer system start-up operations continue. In another embodiment, a computer system's automatic system recovery timer is set and started before control of the computer system is transferred to an operating system.

Advantages of the invention include, but are not limited to, one or more of the following: (1) errors occurring during the system boot process can be identified and responded to; (2) one of a plurality of system ROM partitions may be selected from which to execute boot instructions; and (3) a system which has had its start-up program instructions improperly modified may access a backup version of those instructions without needing to reboot the system. Other advantages of the invention will be obvious in light of the detailed description to follow and the claims.

DETAILED DESCRIPTION

Figure 1:
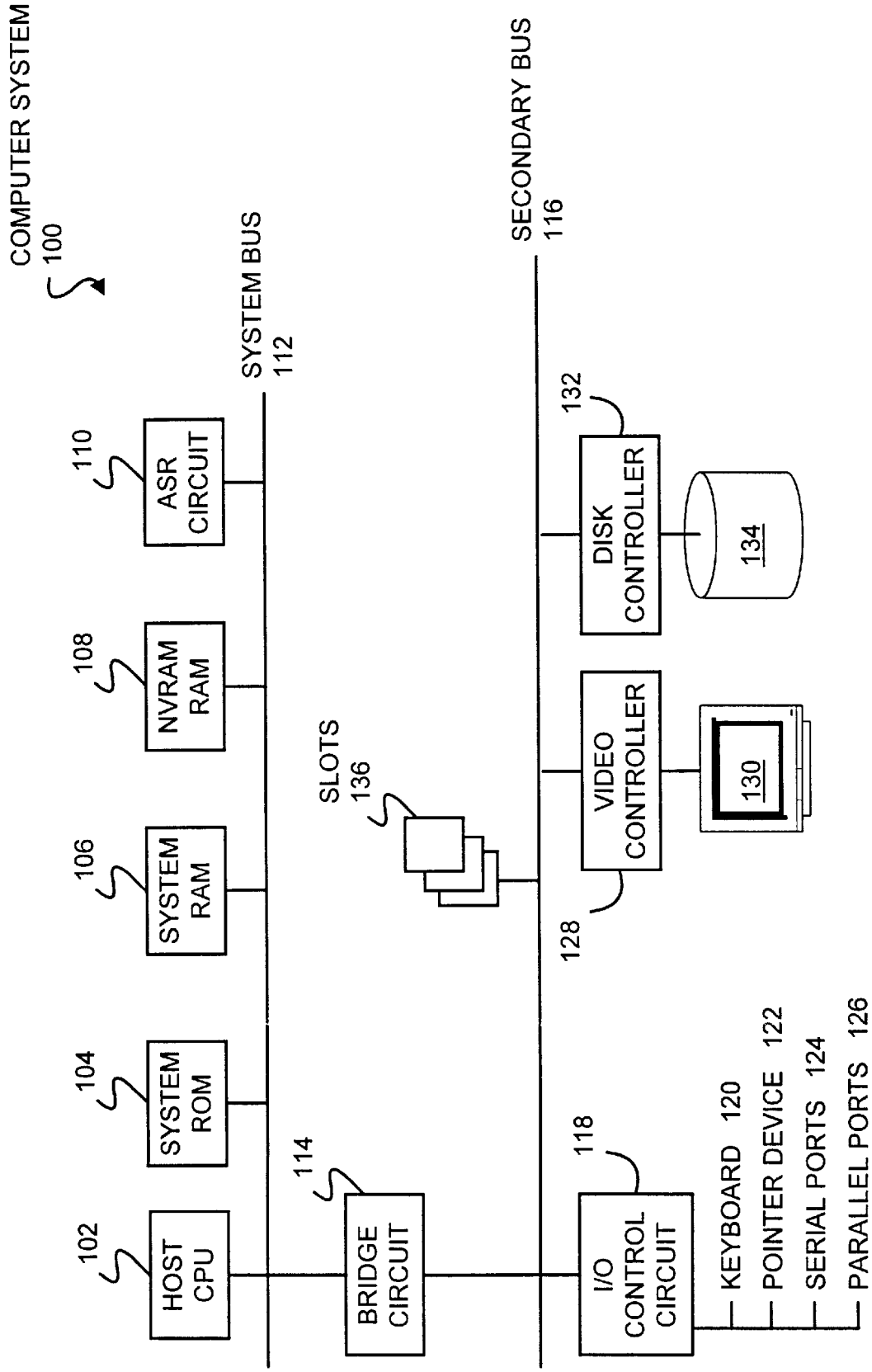
FIG. 1 shows an illustrative computer system having automatic system recovery capability.
Figure 2:
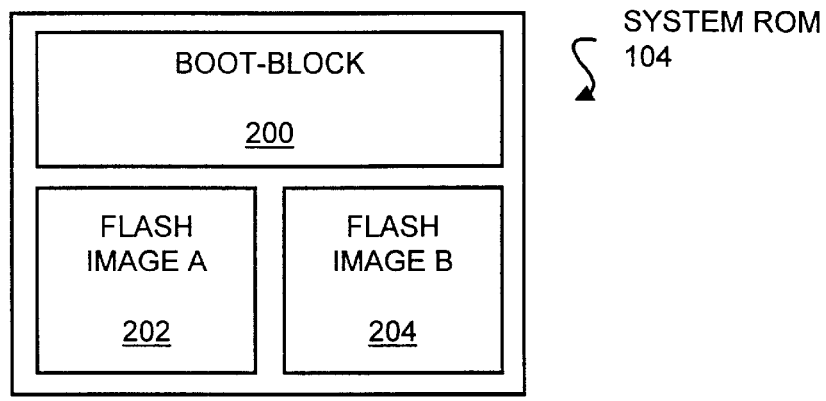
FIG. 2 shows a multiple image system ROM.

Referring initially to FIG. 1, a computer system 100 having an Automatic System Recovery (ASR) capability includes a host processor (CPU) 102, Read Only Memory (ROM) 104, Random Access Memory (RAM) 106, non-volatile RAM (NVRAM) 108, and an ASR circuit 110 connected to the system bus 112. Illustrative host processors 102 include the stored in NVRAM 106), initialize memory, test and initialize system components, and bootstrap the operating system before beginning normal user operations. When power is supplied to the computer system 100 the host processor 102 begins executing a part of the Basic Input-Output System (BIOS) program called the Power On System Test (POST). Referring to FIG. 2, the BIOS can be permanently stored in a plurality of bootable partitions of system ROM 104. In one embodiment, system ROM 104 includes a non-modifiable boot-block 200 and a plurality of additional reprogrammable bootable partitions (only two are shown in FIG. 2, 202 and 204). Each FLASH image 202 and 204 can store a different version of BIOS code. Each of FLASH images A and B (202 and 204) can be embodied in the same memory device as the boot-block 200. Similarly, FLASH images A and B (202 and 204) can be in the same or in separate memory devices.

The ability to reprogram a partition of the system ROM (hereinafter referred to as FLASH ROM 104) allows the computer system's start-up code to be easily updated. Having multiple FLASH images allows the system 100 (automatically or under user control) to select between different versions of BIOS start-up images during up-grade process and/or to revert to the last known good BIOS image if a newly loaded FLASH image is corrupt or non-functional. The process of selecting between two or more FLASH images during error recovery is referred to as fail-over and is discussed further below.

Figure 3:
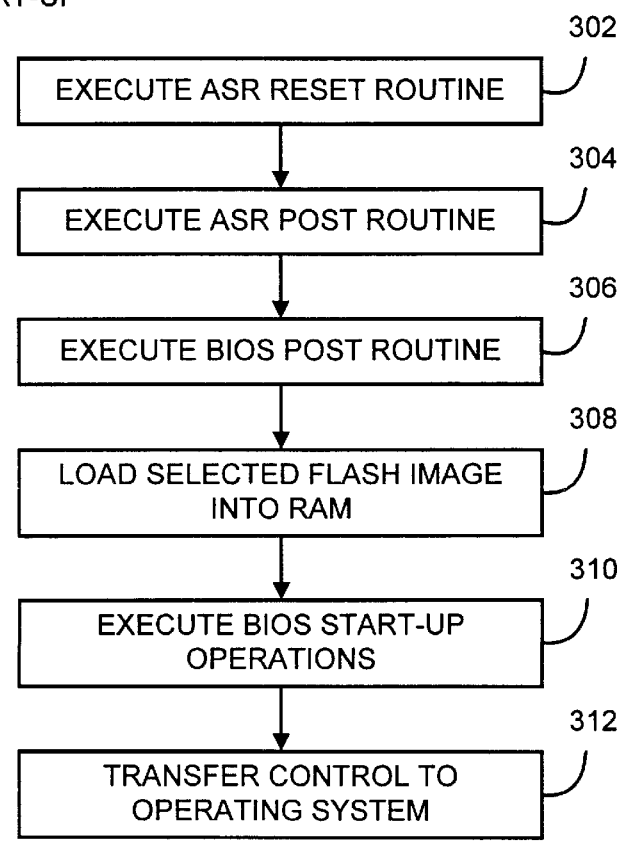
FIG. 3 illustrates a system start-up routine.

Referring now to FIG. 3, system start-up 300 and POST program execution will now be described. Start-up processing begins with execution of an ASR reset routine (step 302), followed by execution of an ASR post routine (step 304), followed by execution of a BIOS post routine (step 306). All three of these routines are executed out of PENTIUM, PENTIUM PRO, and 80X86 family of processors from Intel Corporation. System ROM 104 can use programmable versions of read only memory such as Electrically Erasable Programmable ROM (EEPROM). Reprogrammable ROMs of the type used in the inventive system are generally referred to as FLASH ROMs. Non-Volatile RAM 108 can be a CMOS memory device capable of retaining stored information even after the system 100 is powered down. ASR circuit 110 typically includes memory, timer circuitry, clock circuitry, and control logic. The function of the ASR circuit 110 is to initiate a recovery/reset action when it's timer expires. During normal operation, the ASR's timer is periodically reinitialized (after which the timer resumes its timing function) to prevent an unwanted reset operation. Commonly assigned U.S. Pat. No. 5,390,324 entitled "Computer Failure Recovery and Alert System" by Burckhartt et al., describes an illustrative ASR circuit. Burckhartt et al., is hereby incorporated in its entirety by reference.

A bridge circuit 114 couples the system bus 112 to a secondary bus 116. The secondary bus could be, for example, a Peripheral Component Interface (PCI) bus, an Industry Standard Architecture (ISA) bus, an Extended Industry Standard Architecture (EISA) bus, or a combination of one or more of these busses. An input/output (I/O) control circuit 118 provides an interface for a user keyboard 120, a pointer device 122, and serial 124 and parallel 126 ports. Other components coupled to the secondary bus 116 can include a video controller card 128 and associated display 130, a disk controller card 132 and associated disks (one shown) 134. The secondary bus 116 may also have slots 136 for additional components.

On computer system 100 power-up, the host processor 102 must set its operational parameters (many of which are the FLASH ROM's 104 boot-block 200. Following successful completion of the BIOS post routine, the selected FLASH image is loaded into system RAM 106 (step 308) and start-up operations continue in a conventional manner (step 310). The last action taken during POST processing by the BIOS is to look for and transfer control to an operating system (step 312). This last step is known as "bootstrapping" the operating system. BIOS start-up operations (step 310) and transfer of control to the operating system (step 312) are controlled by instructions loaded into the system RAM 106 from the selected FLASH image.

The ASR reset routine (step 302) initializes ASR parameters and puts the ASR circuit's timer into a known state so that it will not time-out (i.e., initiate a reset action) during this portion of the POST routine. ASR parameters may be stored in the NVRAM 108 and can include: a RESET flag indicating whether the most recent system reset was caused by the ASR timer; a TIMER_ENABLED flag indicating whether the ASR timer is enabled; a HALT flag indicating whether the program should halt due to a system memory error; a BOOT_UTILITIES flag indicating whether the computer system 100 should execute a diagnostic program; a DIAGS flag indicating whether an ASR diagnostics program is in progress; FREQUENCY_TEST and RESET_TEST flags that indicate when the ASR timer has been successfully tested; and a BOOT_OS flag indicating that computer system 100 should boot to its operating system.

The ASR post routine (step 304) tests and initializes the ASR timer circuitry. If the timer passes its operational test, the FREQUENCY_TEST and RESET_TEST flags are set and a value representing the ASR timer's specified time-out period is loaded into the timer.

The BIOS post routine (step 306) determines if early ASR protection is enabled, fail-over capability, and which FLASH image (e.g., 202 or 204) from which to execute during the remainder of system start-up (steps 310 and 312).

Figure 4:
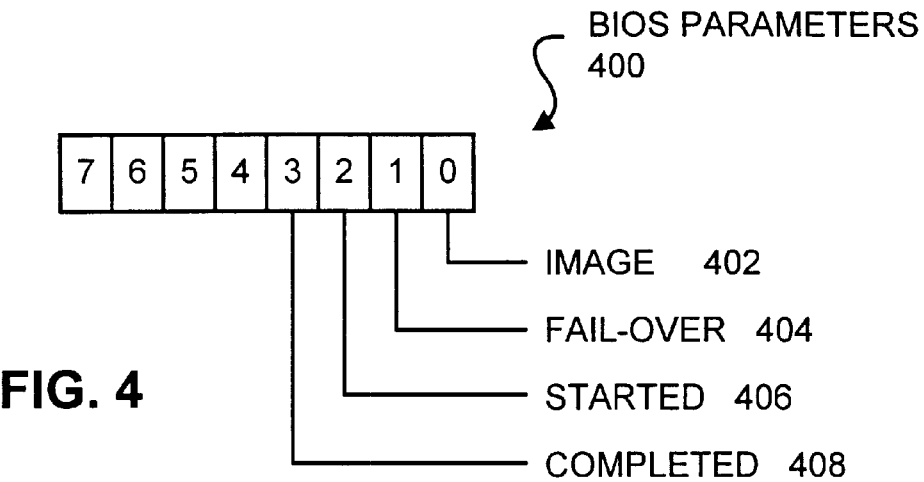
FIG. 4 shows an illustrative set of Basic Input-Output System (BIOS) parameters.
Figure 5:
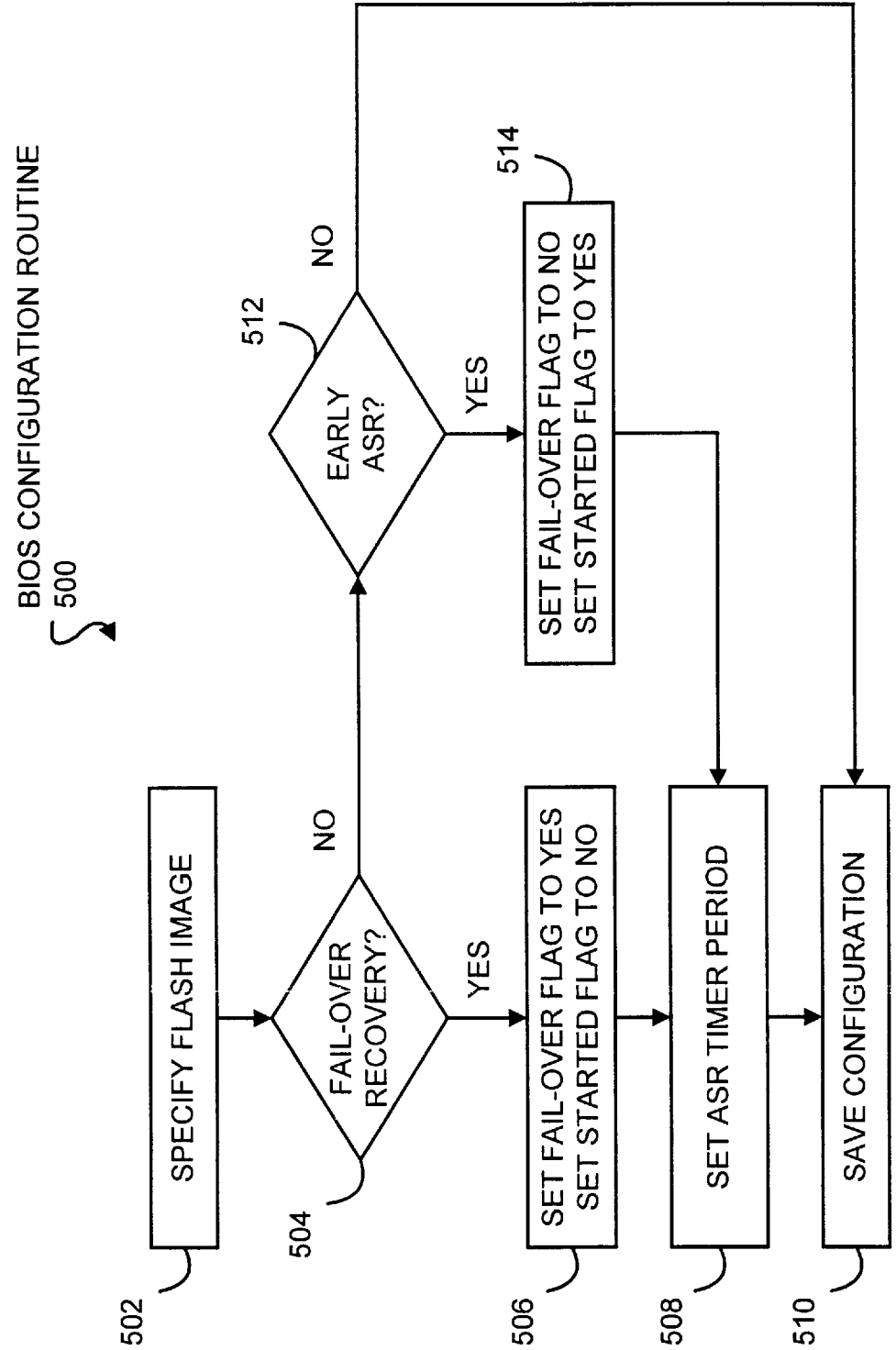
FIG. 5 illustrates a BIOS configuration routine.

As shown in FIG. 4, a number of BIOS parameters 400 (stored in NVRAM 108) are used during BIOS post routine 306 execution. Each parameter represents a particular preselected feature of the BIOS and include: an IMAGE flag 402 indicating which flash image (see FIG. 2) to load; a FAIL-OVER flag 404 indicating whether a recovery operation should use an alternative FLASH ROM image; a STARTED flag 406 indicating, in conjunction with the FAIL-OVER flag whether early ASR protection is enabled; and a COMPLETED flag 408 indicating whether the system has successfully completed the start-up process. The COMPLETED flag can only be set to yes by the operating system. When more than two FLASH images exist, the IMAGE parameter 402 must be extended. For example, if there were four FLASH images from which the computer system could boot, the IMAGE flag would be 2-bits. As shown in FIG. 5, user selectable BIOS parameters 400 are set via a BIOS configuration routine 500. First, the user may specify which of the possible FLASH images to load during start-up (step 502). If the user elects to enable fail-over protection (the 'yes' prong of step 504), the FAIL-OVER flag 404 is set to yes and the STARTED flag 406 is set to no (step 506). The user is then prompted for an ASR time-out period (step 508) which may be, for example, 5, 10, 15, 20, or 30 minutes. Upon completion, BIOS parameter settings are stored in NVRAM 108 (step 510). If fail-over recovery is not selected (the 'no' prong of step 504), the user may enable early ASR protection. If early ASR protection is selected (the 'yes' prong of step 512), the FAIL-OVER flag 404 is set to no and the STARTED flag 406 is set to yes (step 514) and processing continues at step 508. If early ASR protection is not selected (the 'no' prong of step 512), processing continues at step 510.

Figure 6C:
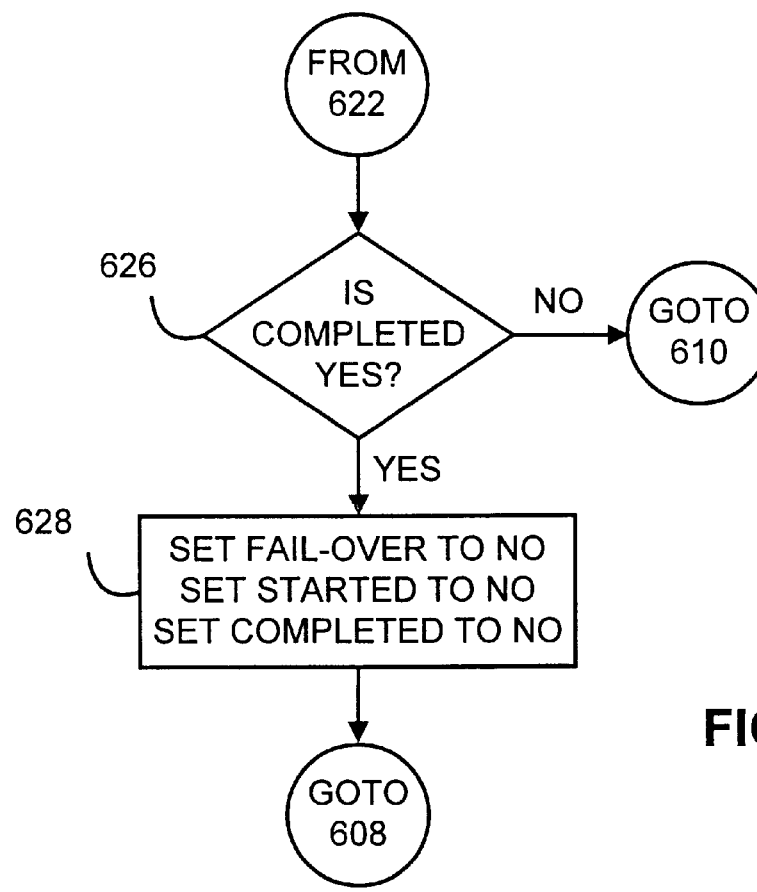
FIG. 6A through 6C illustrate a BIOS post routine.
Figure 6A:
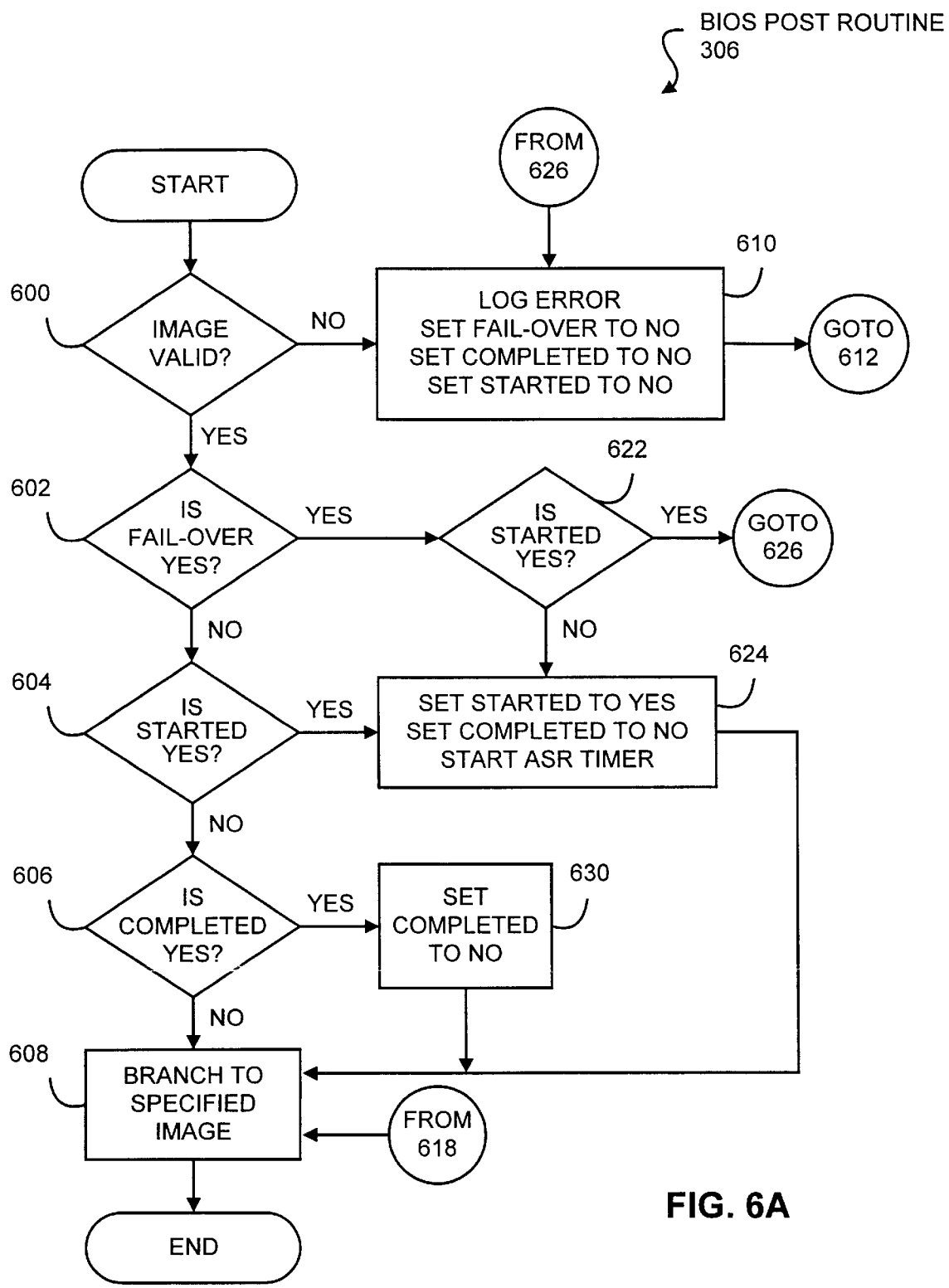
Figure 6B:
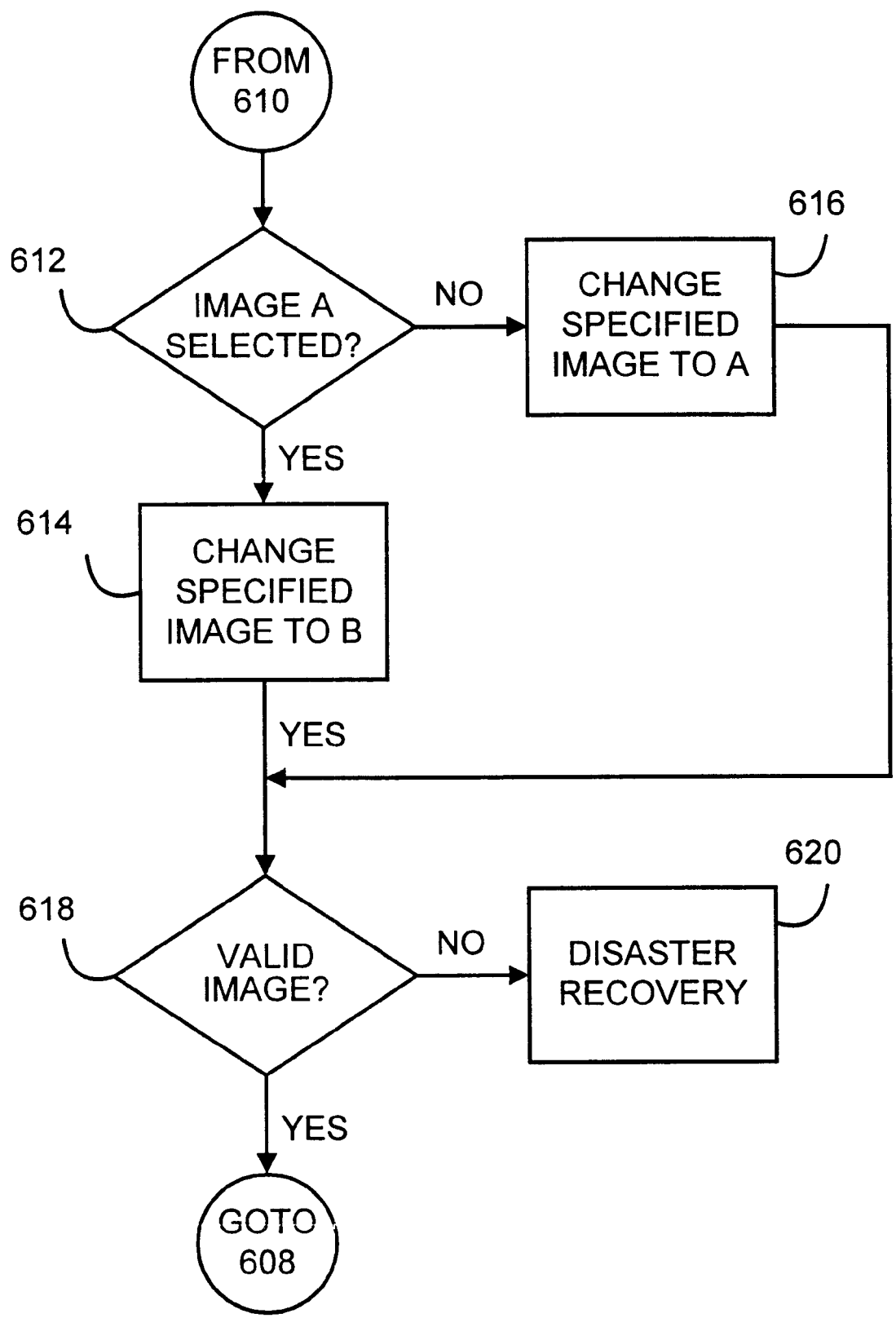

Referring now to FIG. 6, the BIOS post routine 306 begins by determining if the FLASH image selected as the boot image is valid (step 600). FLASH image validity can be determined by the presence, for example, of a specific predefined bit pattern at the end of the FLASH image's memory store. Alternatively, a checksum of the FLASH image can be performed to determine its validity. If the specified FLASH image is valid (the 'yes' prong of step 600), and the FAIL-OVER 404 and STARTED 406 and COMPLETED 408 flags are not set (the 'no' prong of steps 602 through 606), processing continues with a branch to the selected FLASH image at step 608. If, at step 606, the completed bit is yes (the 'yes' prong of step 606), it is set to no (step 630) before the specified image is processed at step 608.

If the originally specified FLASH image is invalid at step 600, the error condition (i.e., the specified FLASH image is invalid) is logged and BIOS parameters are updated (step 610). Error logging includes recording the detected anomalous situation in a file, often referred to as a health log. The health log may be reviewed at a later time to determine what the cause of a failure was and whether the failure caused a system reset.

Fail-over processing begins after step 610 and includes steps 612 through 620. If the specified (invalid) FLASH image is image A (the 'yes' prong of step 612), it is changed to image B (step 614). If the invalid FLASH image is not image A (the 'no' prong of step 612), it is changed to image A (step 616). After an alternate FLASH image is selected, it is tested for validity in the same manner as described above (step 618). If the alternate FLASH image is invalid (the 'no' prong of step 618), no valid FLASH image is available to complete the computer system boot process. In this situation a disaster recovery routine is entered (step 620). The purpose of a disaster recovery is to place the computer system 100 into a state that can be repaired. See, for example, Burckhartt et al. cited above. If the alternate FLASH image is valid (the 'yes' prong of step 618), processing continues at step 608.

If the user has specified fail-over recovery (the 'yes' prong of step 602) and the STARTED flag 406 is no (the 'no' prong of step 622), the STARTED flag 406 is set to yes, the COMPLETED flag 408 is set to no, and the ASR timer is started (step 624). BIOS post processing continues at step 608.

If the user has specified fail-over recovery (the 'yes' prong of step 602) and the STARTED flag 406 is yes (the 'yes' prong of step 622) and the COMPLETED flag 408 is yes (the 'yes' prong of step 626), the FAIL-OVER 404, STARTED 406, and COMPLETED 408 flags are set to no (step 628) and processing continues at step 608. If the COMPLETED flag 408 is no at step 626, processing continues at step 610.

If the STARTED 406 flag is found to be no at step 622 or found to be yes at step 604, the STARTED flag is set to yes, the COMPLETED 408 flag is set to no, and the ASR timer is started (step 624). Initiation of the ASR timer at step 624 provides early ASR protection. Early ASR allows start-up errors occurring during the boot process (before the specified FLASH image is loaded and before control of the computer system is transferred to the operating system, see FIG. 3, steps 308 through 312) to be handled by established ASR techniques.

On completion of the BIOS post routine (assuming disaster recovery is not entered, see 620), start-up instructions executing from the boot-block 200 are complete. The specified FLASH image is loaded into system RAM 106 (see step 308) and start-up continues in a conventional manner (step 310). This start-up (boot) process allows a user to upgrade their BIOS code or test new BIOS code without giving up the functionality of known working code.

As described above, the last action taken by the BIOS is to initiate the operating system boot-strap loader (step 312). The boot-strap loader initiates a search for an operating system on the disk 134 (floppy, fixed, or optical) at a specific location. If the operating system's boot record is found, it is loaded into system RAM 106 and given control of the computer system 100. The computer system 100 is now ready to load the rest of the operating system from the drive that contains the system disk.

Significant features of the computer system 100 include support of early ASR enablement and multiple BIOS FLASH images. Early ASR allows start-up errors occurring during the boot process (steps 302 through 306) to be handled by established ASR techniques. Multiple BIOS FLASH images allow a user to upgrade and/or test new BIOS routines without the potential of losing the functionality of their existing system. For instance, a first FLASH image could contain a known working copy of the BIOS while a second FLASH image could be a BIOS upgrade. If the upgrade BIOS will not load or is inoperable when loaded (e.g., incorporates program code that causes a system reset), the computer system 100 can automatically revert to the known good FLASH image.

The foregoing disclosure and description of the preferred embodiments are illustrative only and are not to be considered limiting. Various changes in the size, shape, materials, components, circuit elements, wiring connections and contacts, as well as in the details of the illustrated methods of operation may be made without departing from the spirit of the invention.

What is claimed is:

1. An apparatus for selecting a bootable partition of memory for execution by a computer, comprising:
   a first programmable memory adapted to include a plurality of bootable images, and further comprising a non-programmable boot-block portion; and
   a second programmable memory adapted to include status information indicating which one of the plurality of bootable images is selected.

2. The apparatus of claim 1 wherein the first programmable memory is an electrically erasable read only memory.

3. The apparatus of claim 1 wherein the second programmable memory is a non-volatile random access memory.

4. The apparatus of claim 1 including a computer processor adapted to perform an integrity check of the preselected bootable image before executing the preselected bootable image and to select a second bootable image if the preselected bootable image fails the integrity check.

5. The apparatus of claim 4 wherein the computer processor is further adapted to perform an integrity check of the second bootable image before executing the second bootable image.

6. An apparatus for executing a bootable image of memory, comprising:
   a first programmable memory adapted to include a plurality of bootable images, and also comprising a non-programmable boot-block portion;
   a second programmable memory adapted to include status information indicating which one of the plurality of bootable images is preselected; and
   a computer processor, operably coupled to the first and second programmable memories, adapted to execute the preselected bootable image.

7. The apparatus of claim 6 wherein the computer processor is further adapted to perform an integrity check of the preselected bootable image before executing the preselected bootable image.

8. The apparatus of claim 7 wherein the computer processor is further adapted to select a second bootable image if the preselected bootable image fails the integrity check.

9. The apparatus of claim 8 wherein the computer processor is further adapted to perform an integrity check of the second bootable image before executing the second bootable image.

10. The apparatus of claim 6 wherein the plurality of bootable images comprise different copies of at least a portion of a basic input-output system.

11. The apparatus of claim 6 wherein the first programmable memory is an electrically erasable read only memory.

12. The apparatus of claim 6 wherein the second programmable memory is a non-volatile random access memory.

13. A method of executing a bootable image of a memory in a computer system, comprising:
   preselecting one of a plurality of bootable images stored in memory which further comprises a non-programmable boot-block portion;
   testing the preselected bootable image;
   executing the preselected bootable image if the preselected bootable image successfully passes the test; and
   selecting a second bootable image stored in memory if the preselected bootable image fails the test.

14. The method of claim 13 wherein preselecting includes:
   selecting one of the plurality of bootable images; and,
   storing an indicator identifying the selected bootable image in a further memory.

15. The method of claim 14 wherein the further memory is a nonvolatile random access memory.

16. The method of claim 13 wherein the different ones of the bootable images are stored in a common memory device.

17. The method of claim 16 wherein the common memory device is an electrically erasable read only memory.

18. The method of claim 13 wherein each of the plurality of bootable images comprise at least a portion of a basic input-output system.

19. The method of claim 13 wherein the test is an integrity test.

20. The method of claim 13 further comprising:
   testing the second bootable image; and
   selecting yet another said bootable image stored in memory if the second bootable image fails the test.

21. A method of booting a computer system, comprising: preselecting one of a plurality of different bootable images stored in memory, said memory further comprising a non-programmable boot-block portion; testing the preselected bootable image; executing the preselected bootable image if preselected bootable image successfully passes the test; selecting a second different bootable image stored in memory if the preselected bootable image fails the test; testing the second bootable image; and aborting the boot process if the second bootable image fails the test.

22. The method of claim 21 wherein preselecting includes:
   selecting one of the plurality of bootable images; and
   storing an indicator identifying the selected bootable image in a further memory.

23. The method of claim 22 wherein the further memory is a nonvolatile random access memory.

24. The method of claim 21 wherein each of the bootable images is stored in electrically erasable read only memory.

25. The method of claim 24 wherein each of the bootable images is stored in a common memory device.

26. The method of claim 21 wherein each of the plurality of bootable images comprises at least a portion of a basic input-output system.

27. The method of claim 21 wherein the test is an integrity test.

28. The method of claim 21 wherein aborting includes:

storing an indicator identifying the computer boot operation failed in a further memory.

29. The method of claim 28 wherein the further memory in a nonvolatile memory.

30. A method according to claim 21, wherein, in addition to preselecting one of said plurality of bootable images, an automatic system recovery timer is set to expire after a specified interval; and the automatic system recovery timer is initiated, to prevent initiation of a reset action, before control of the computer system is transferred to an operating system.

31. The method of claim 30 wherein the specified interval is stored in a nonvolatile memory available to the computer system.

32. The method of claim 31 wherein the specified interval is user specified.

33. A method of booting a computer system, comprising:

preselecting one of a plurality of different bootable images stored in memory, said memory further comprising a non-programmable boot-block portion;

preselecting an early system recovery option;

determining if an immediately prior computer system boot operation was successful; and selecting a second bootable image stored in memory if the immediately prior computer system boot operation was not successful.

34. The method of claim 33 further comprising:

executing the preselected bootable image if the immediately prior computer system boot operation was successful; and executing the second bootable image if the immediately prior computer system boot operation was not successful.

35. The method of claim 33 wherein preselecting includes:

selecting one of the plurality of bootable images; and storing an indicator identifying the selected bootable image in a further memory.

36. The method of claim 35 wherein the further memory is a nonvolatile random access memory.

37. The method of claim 33 wherein said memory is an electrically erasable read only memory.

38. The method of claim 33 wherein each of the plurality of bootable images comprises at least a portion of a basic input-output system.

39. The method of claim 33 further comprising:

testing the preselected bootable image before determining if an immediately prior computer system boot operation was successful.

40. A method of booting a computer system, comprising:

preselecting one of a plurality of bootable images stored in memory; said memory further comprising a non-programmable boot-block portion; preselecting an early system recovery option;

determining if an immediately prior computer system boot operation was successful;

selecting a second bootable image stored in memory if the immediately prior computer system boot operation was not successful;

testing the second bootable image after it is selected and before it is executed; and aborting the boot process if the second bootable image fails the test; and wherein aborting the boot process includes storing an indicator in a further memory indicating that the computer system boot operation was not successful.

41. The method of claim 40 wherein the further memory is a nonvolatile random access memory.

42. The method of claim 40 wherein the test is an integrity test.

43. A method of booting a computer system, comprising:

preselecting one of a plurality of different bootable images stored in first memory, said memory further comprising a non-programmable boot-block portion;

preselecting an early system recovery option;

determining if an immediately prior computer system boot operation was successful by reading an indicator from a further memory; and selecting a second bootable image stored in said first memory if the immediately prior computer system boot operation was not successful.

44. The method of claim 43 wherein the further memory is a non-volatile memory.

45. The method of claim 43 wherein the first memory comprises a common electrically erasable read only memory.

46. A computer system comprising:

a bus;

a processing unit operatively coupled to the bus;

a first programmable memory operatively coupled to the bus and adapted to include a plurality of bootable images, said first programmable memory further comprising a non-programmable boot-block portion; and a second programmable memory operatively coupled to the bus and adapted to include status information indicating which one of the plurality of different bootable images is selected for loading at computer system start-up.

47. The computer system of claim 46 wherein the first programmable memory is an electrically erasable read only memory.

48. The computer system of claim 46 wherein the second programmable memory is a non-volatile random access memory.

* * * * *